United States Patent
Yuno et al.

(10) Patent No.: US 9,610,665 B2
(45) Date of Patent: Apr. 4, 2017

(54) STAMPING-FACE PLATE HOLDER

(71) Applicant: CASIO COMPUTER CO., LTD., Shibuya-ku, Tokyo (JP)

(72) Inventors: Hirotaka Yuno, Fussa (JP); Takayuki Hirotani, Akiruno (JP); Yasushi Murai, Ome (JP); Shigeru Futawatari, Ome (JP); Takanori Suzuki, Kodaira (JP); Yoshimasa Yokoyama, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 321 days.

(21) Appl. No.: 14/314,946

(22) Filed: Jun. 25, 2014

(65) Prior Publication Data
US 2015/0001779 A1    Jan. 1, 2015

(30) Foreign Application Priority Data

Jun. 28, 2013  (JP) ................................ 2013-136947

(51) Int. Cl.
*B41K 1/02* (2006.01)
*B23Q 3/18* (2006.01)
(Continued)

(52) U.S. Cl.
CPC ................. *B23Q 3/18* (2013.01); *B41D 7/00* (2013.01); *B41J 2/315* (2013.01); *B41J 2/32* (2013.01);
(Continued)

(58) Field of Classification Search
CPC .. B41C 1/055; B41K 1/02; B41K 1/50; B41K 3/62; B41J 2/32; B41J 2/315;
(Continued)

(56) References Cited

U.S. PATENT DOCUMENTS

| 5,551,337 | A  | * | 9/1996 | Miki ...................... B41C 1/144 101/125 |
| 6,276,272 | B1 | * | 8/2001 | Takami ................... B41K 1/50 101/327 |
| 2004/0003735 | A1 |   | 1/2004 | Humal |
| 2011/0061802 | A1 | * | 3/2011 | Raming ................ G09F 3/0288 156/256 |
| 2014/0013974 | A1 | * | 1/2014 | Matsushita .............. B41K 1/40 101/333 |

(Continued)

FOREIGN PATENT DOCUMENTS

| JP | 07251558 A | 10/1995 |
| JP | 10100464 A |  4/1998 |

(Continued)

OTHER PUBLICATIONS

Extended European Search Report dated Aug. 21, 2014 issued in counterpart European Application No. 14173899.7.
(Continued)

*Primary Examiner* — Jill Culler
*Assistant Examiner* — Marissa Ferguson Samreth
(74) *Attorney, Agent, or Firm* — Holtz, Holtz & Volek PC

(57) ABSTRACT

A stamping-face plate holder is provided. The stamping-face plate holder comprises a plate holding member formed with a positioning recess for receiving and positioning a stamping-face plate and a film for covering the stamping-face plate held in the plate holding member. The stamping-face plate is made of a porous material impregnated with ink. The plate holding member consists of a top paper board and a bottom paper board, both boards being integrated by adhering and the positioning recess is formed in the top paper board. The film covers the whole surface of the top paper board and adheres to the top paper board excepting the stamping-face plate held therein.

13 Claims, 6 Drawing Sheets

(51) Int. Cl.
*B41K 3/62* (2006.01)
*B41J 2/32* (2006.01)
*B41J 2/315* (2006.01)
*B41K 1/50* (2006.01)
*B41D 7/00* (2006.01)

(52) U.S. Cl.
CPC .............. *B41K 1/02* (2013.01); *B41K 1/50* (2013.01); *B41K 3/62* (2013.01)

(58) Field of Classification Search
CPC .... B41J 2/355; B41M 5/0052; B41M 5/0064; B23Q 3/18; B41D 7/00
See application file for complete search history.

(56) References Cited

U.S. PATENT DOCUMENTS

2014/0157638 A1\* 6/2014 Shanley ................ G09F 3/10
40/675

FOREIGN PATENT DOCUMENTS

| | | |
|---|---|---|
| JP | 11138960 A | 5/1999 |
| JP | 2000052631 A | 2/2000 |
| JP | 2000108474 A | 4/2000 |
| JP | 2000211226 A | 8/2000 |
| JP | 2002172836 A | 6/2002 |
| JP | 2003154743 A | 5/2003 |
| JP | 2005161865 A | 6/2005 |
| JP | 2009208294 A | 9/2009 |
| JP | 2012153102 A | 8/2012 |
| WO | 0232668 A1 | 4/2002 |

OTHER PUBLICATIONS

Japanese Office Action (and English translation thereof) dated Feb. 3, 2015, issued in counterpart Japanese Application No. 2013-136947.

\* cited by examiner

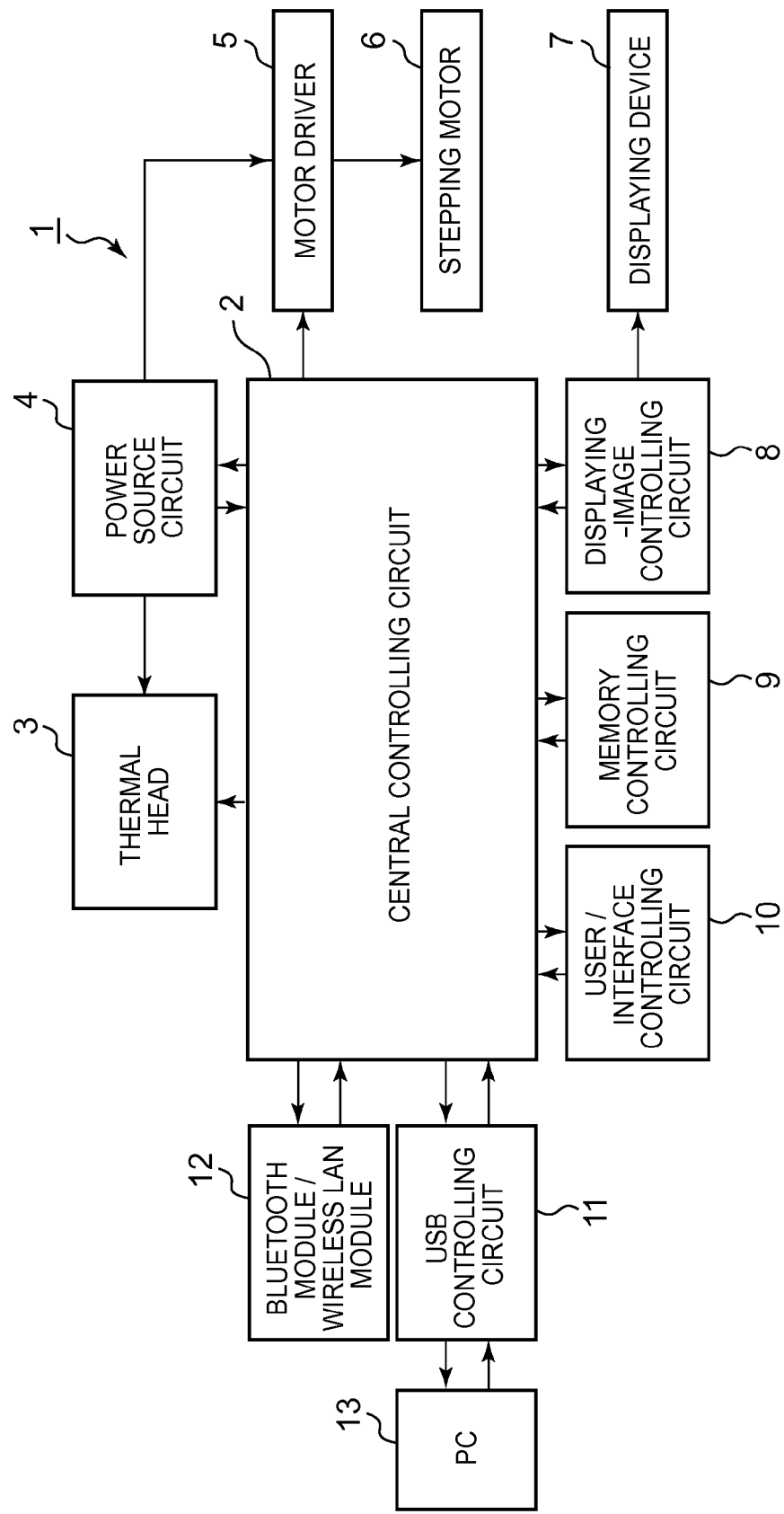

FIG. 6A
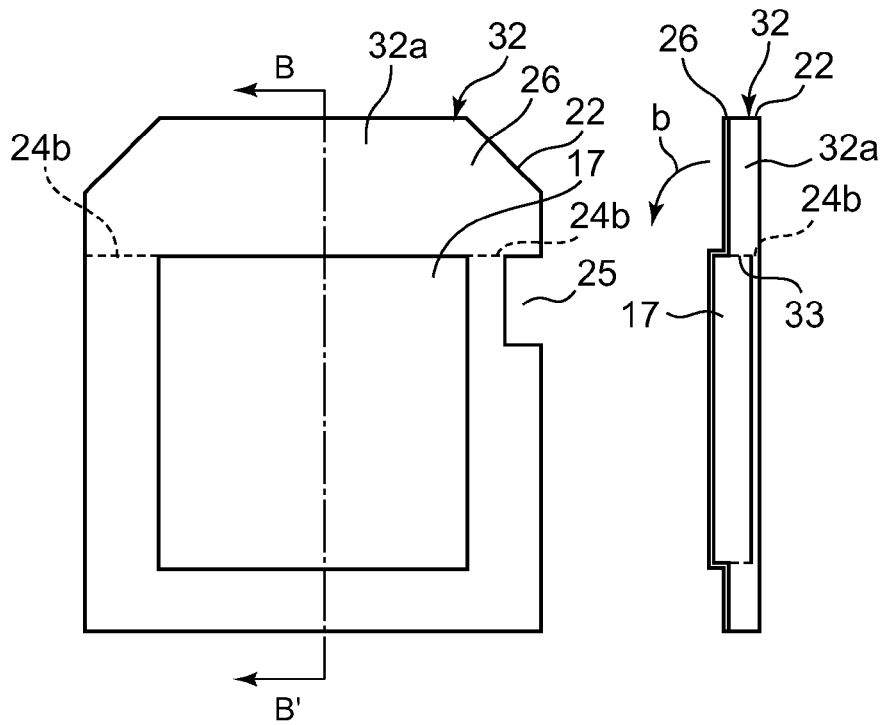
FIG. 6B
FIG. 6C
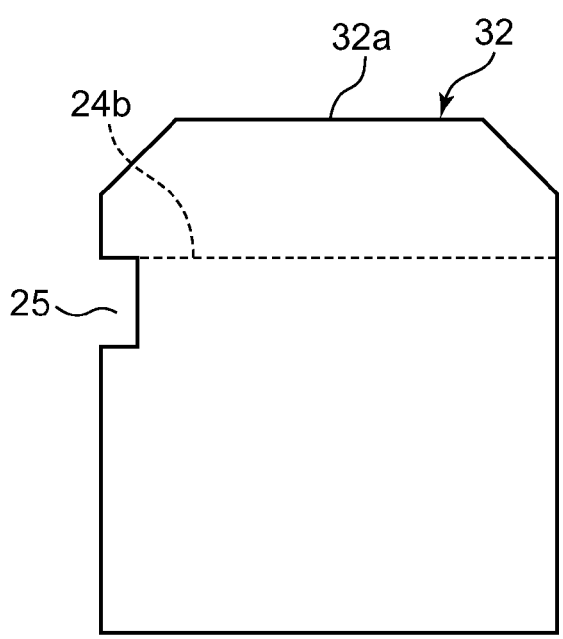

STAMPING-FACE PLATE HOLDER

CROSS-REFERENCE TO RELATED APPLICATION

The present application is based upon and claims the benefit of priority from the prior Japanese Patent Application No. 2013-136947, filed Jun. 28, 2013, the entire contents of which are incorporated herein by reference.

BACKGROUND OF THE INVENTION

1. Field of the Invention

The present invention relates to a stamping-face plate holder not expensive in producing costs and simple in configuration, used for making a stamping-face plate of a stamp.

2. Description of the Related Art

In general, when affixing a seal on something, we used to use a stamp and put stamp ink on the stamping face of the stamp each time of affixing a seal. To avoid troublesome operation of putting the stamp ink on the stamp each time when affixing a seal, it is known to use a self-inking rubber stamp made of a material such as sponge rubber which is previously impregnated with stamp ink.

For instance, Japanese Unexamined Patent Publication No. Hei 07-251558 proposes a method of producing a stamp. In the proposed method of producing a stamp, a thermal printer having a thermal head is used, and a cassette case which contains a roll of a tape of sponge material for making a stamp plate is installed on the thermal printer, and a printing image entered to the thermal printer is printed on the material pulled out from the cassette case with the thermal head to make a stamping-face plate of a stamp.

In the technique proposed by Japanese Unexamined Patent Publication No. Hei 07-251558, the cassette case containing the sponge material for making a stamp plate is used, and when all the sponge material for making a stamp plate has been used up, the cassette case will be a waste product, inviting a trouble that such waste product will raise commodity expenses.

The thermal printer using the cassette case containing the material for making a stamp plate will be complex in mechanism and large in scale for making stamps of various sizes of stamping-face plates. When the maximum size of material for making a stamp plate is used to make stamps of various sizes of stamping-face plates, excess of the material will also increase and such excess material will raise commodity expenses.

Meanwhile, Japanese Unexamined Patent Publication No. Hei 10-100464 discloses a device for making a stamp whose stamping-face plate consisting of an ink permeable portion and an ink non-permeable portion. A thermal head of the device has plural needle-like heating elements and the heating elements are selectively pressed on a porous sheet and heated to make the ink permeable portion and ink non-permeable portion of the stamping-face plate.

The device disclosed in Japanese Unexamined Patent Publication No. Hei 10-100464 has a large-scale driving mechanism using a carriage for carrying the thermal head, which is impossible to meet a recent market demand for downsizing.

Further, it is required to use an edge head as the thermal head, but the edge heads are expansive compared with normal thermal heads. They are about three times as expansive as the normal heads. Generally, the device using the edge head will receive limitation in freedom for design.

SUMMARY OF THE INVENTION

The present invention has been made to solve the problems involved in the conventional techniques and provides a stamping-face plate holder not expensive in producing costs and simple in configuration, used for making a stamping-face plate of a stamp.

According to one aspect of the invention, there is provided a stamping-face plate holder which comprises a plate holding member that detachably holds a stamping-face plate, the stamping-face plate including a porous material impregnated with ink, and a film that covers at least a portion of the stamping-face plate held in the plate holding member.

BRIEF DESCRIPTION OF THE DRAWINGS

FIG. 1 is a block diagram of a system configuration of a thermal printer which uses a stamping-face plate holder to make a stamping-face plate, according to the first embodiment of the present invention.

FIG. 6A is a plane view of the stamping-face plate holder which holds the stamping-face plate (second embodiment).

FIG. 6B is a cross-sectional view of the stamping-face plate holder taken along the line B-B' of FIG. 6A (second embodiment).

FIG. 6C is a rear view of the stamping-face plate holder (second embodiment).

DETAILED DESCRIPTION OF THE PREFERRED EMBODIMENTS

Figure 2A:
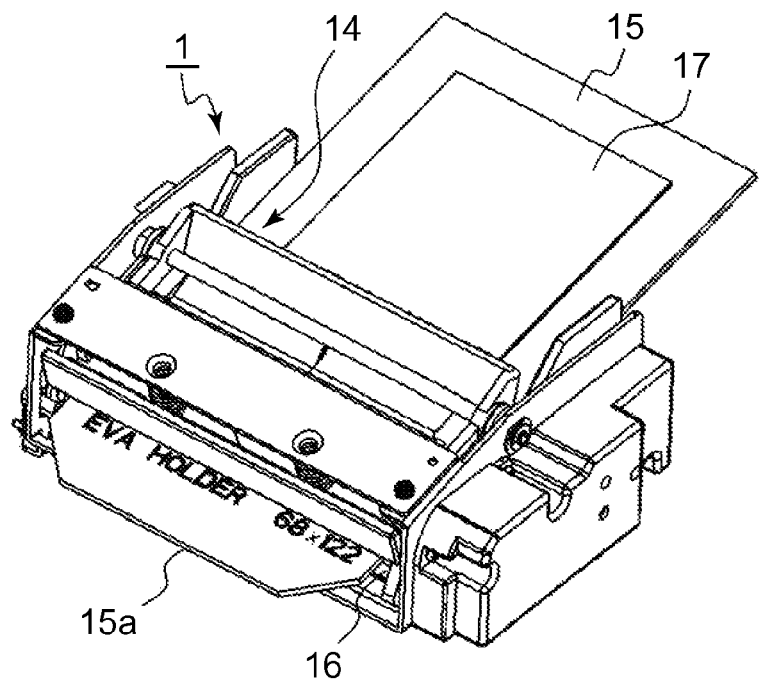
FIG. 2A is an external perspective view of the thermal printer according the first embodiment of the invention.

Now, the preferred embodiments of the present invention will be described with reference to the accompanying drawings in detail.

[First Embodiment]

FIG. 1 is a block diagram of a system configuration of a thermal printer for making a plate, which uses a stamping-face plate holder according to the first embodiment of the present invention.

As shown in FIG. 1, the thermal printer 1 comprises a central controlling circuit 2, a thermal head 3, a power source circuit 4, a motor driver 5, a stepping motor 6, a displaying device 7, a displaying-image controlling circuit 8, a memory controlling circuit 9, a user/interface controlling circuit 10, a USB controlling circuit 11, and Bluetooth (Registered Trademark) module/wireless LAN module 12.

But, all the displaying device 7, the displaying-image controlling circuit 8, the user/interface controlling circuit 10, USB controlling circuit 11, and Bluetooth (Registered Trademark) module/wireless LAN module 12 are not essential elements of the thermal printer 1.

For example, in the case where the thermal printer has to be directly or wirelessly connected with a personal computer (PC) 13, since a user operates on GUI (Graphical User Interface) of the personal computer 13 or a cellular phone terminal (not shown), the displaying-image controlling circuit 8 and the displaying device 7 are not essential elements for the thermal printer 1.

Figure 2B:
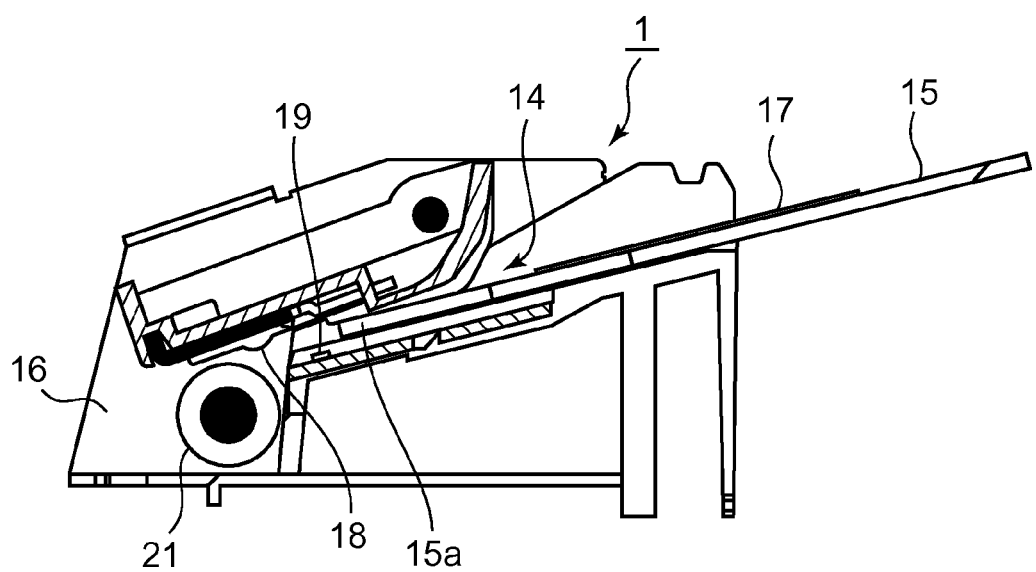
FIG. 2B is a sectional side view of the thermal printer according the first embodiment of the invention.

In the system configuration shown in FIG. 1, the central controlling circuit 2 controls the operation of the whole system. In FIGS. 2A and 2B, all the elements are connected only to the central controlling circuit 2, but these elements are connected to each other through a bus (not shown) for effecting data communication.

The memory controlling circuit 9 contains devices such as ROM (Read Only Memory) and RAM (Random Access Memory), and controls these devices. The displaying device 7 is a displaying device such as LCD (Liquid Crystal Display), and the displaying-image controlling circuit 8 serves to transfer data to the displaying device 7 and also to control turn-on/turn-off of a back-light operation of the displaying device 7.

The user/interface controlling circuit 10 serves to control displaying of a menu image in accordance with information entered through an input device such as a keyboard, a mouse, a remote control device, a button, and touch panel. The power source circuit 4 consists of a power source IC (Integrated Circuit) and the like, and serves to supply the circuits with a required power.

The thermal head 3 receives data and a printing signal output from the central controlling circuit 2 to control a built-in driver IC, thereby performing energization of printing dots. When the printing dots of the thermal head 3 are energized and brought into contact with a printing medium such as a material of porous ethylene-vinyl acetate copolymer (hereinafter, referred to as "EVA"), then printing is performed on same printing medium.

In the system configuration of the present system, those that the peripheral circuits of the central controlling circuit 2 receive from the central controlling circuit 2 are only the data and the printing signal, and the peripheral circuits receive the power required for the printing operation from the power source circuit 4. In addition, the thermal head 3 has a resolution of 200 dots/25.4 mm and an effective printing width of 48 mm.

The motor driver 5 receives a driving signal from output the central controlling circuit 2 to supply the stepping motor 6 with driving power. In practice, the motor driver 5 receives only an exciting signal from the central controlling circuit 2 and obtains actual power from the power source circuit 4.

The central controlling circuit 2 counts the number of pulse signals supplied to the motor driver 5, thereby precisely confirming how much it has made the stepping motor 6 rotate, that is, how much or how long it has transported the printing medium.

In the thermal printer 1 according to the present embodiment of the invention, an one-two phase excitation driving system is employed for transporting the printing medium, and a gear ratio consists of 16 steps/line (0.125 mm). In other words, the printing medium is transported by 0.0078 mm/step.

FIG. 2A is an external perspective view of the thermal printer 1 according the first embodiment of the invention.

FIG. 2B is a sectional side view of the thermal printer 1 according the first embodiment of the invention. As shown in FIG. 2A, the thermal printer 1 has a printing-medium insertion opening 14 and a printing-medium discharge opening 16. The thermal printer 1 is shown in FIG. 2A, with a stamping-face plate holder 15 inserted into the printing-medium insertion opening 14 and with the leading end 15a of the stamping-face plate holder 15 coming out from the printing-medium discharge opening 16. The stamping-face plate holder 15 holds a stamping-face plate 17.

The thermal printer 1 is shown in FIG. 2B, with the leading end 15a of the stamping-face plate holder 15 inserted into the printing-medium insertion opening 14. As shown in FIG. 2B, the leading end 15a of the stamping-face plate holder 15 has been inserted as far as to the position of the thermal head 18. Along a transporting course of the stamping-face plate holder 15, there are provided a sensor 19 and a platen roller 21.

Figure 3A:
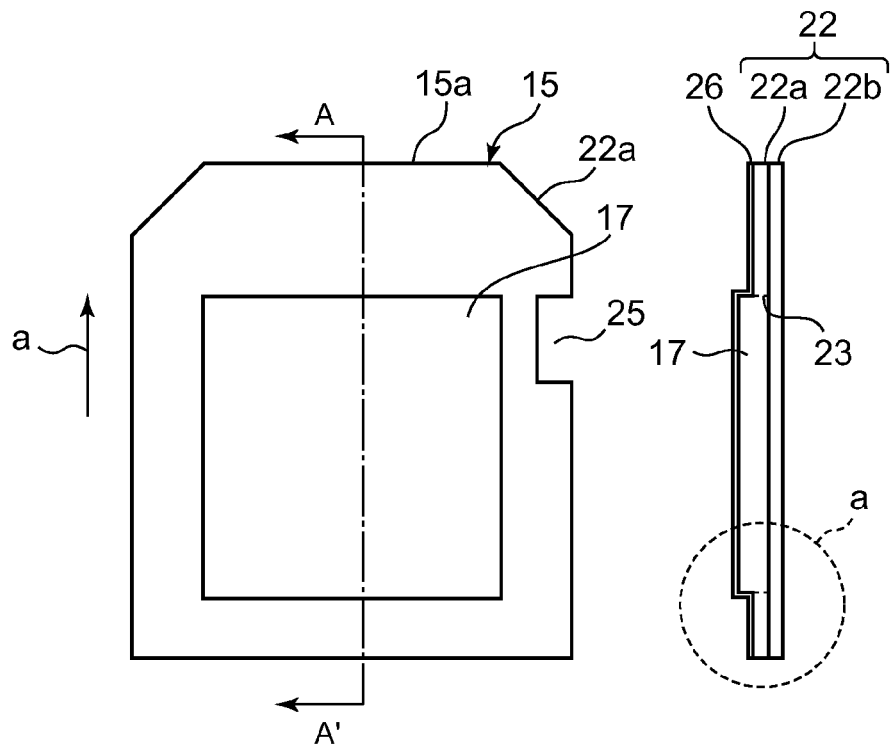
FIG. 3A is a plane view of a stamping-face plate holder which holds the stamping-face plate.
Figure 3B:
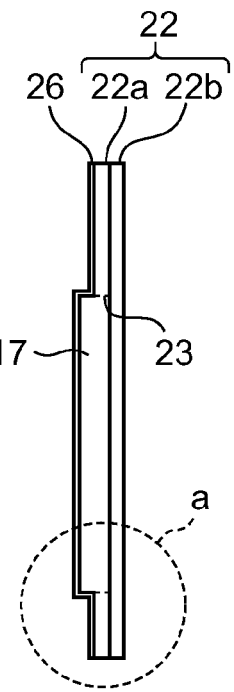
FIG. 3B is a cross-sectional view of the stamping-face plate holder taken along the line A-A' of FIG. 3A.
Figure 3C:
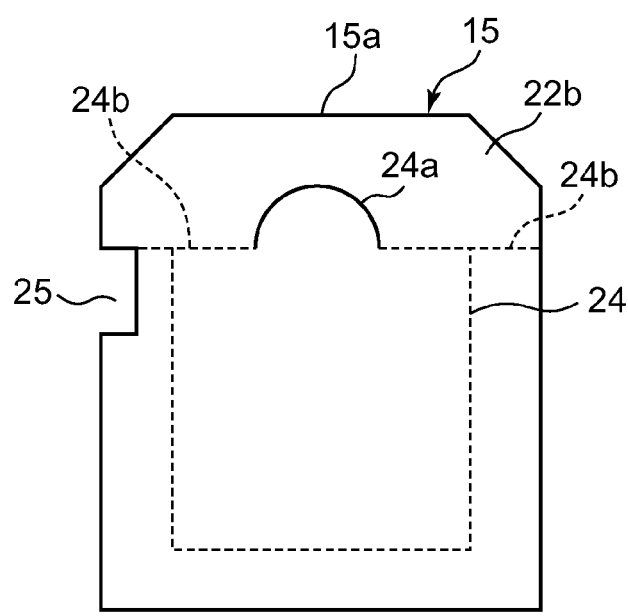
FIG. 3C is a rear view of the stamping-face plate holder.

FIG. 3A is a plane view of the stamping-face plate holder holding the stamping-face plate 17. FIG. 3B is a cross-sectional view of the stamping-face plate holder 15 taken along the line A-A' of FIG. 3A. FIG. 3C is a rear view of the stamping-face plate holder 15. As shown in FIG. 3A and FIG. 3C, the stamping-face plate holder 15 serving as a holder that firmly holds the stamping-face plate 17 fixed at its central position. In FIG. 3A, an arrow "a" indicates a direction in which the stamping-face plate holder 15 is inserted into the thermal printer 1.

The stamping-face plate holder 15 consists of two thick paper boards (coated boards) 22 (top paper board 22a, bottom paper board 22b) integrated by adhering, as shown in FIG. 3B. The stamping-face plate holder 15 has a cutout 25 for a sensor in its one lateral part (on the right side as seen in FIG. 3A).

When the stamping-face plate holder 15 is inserted into the thermal printer 1, the sensor 19 of the thermal printer 1 detects the cutout 25 of the stamping-face plate holder 15 to confirm a position for starting a printing operation and performing other controlling operations. A thermal printing operation for printing solid black data around on the leading end of the printing medium is performed based on the confirmation of the position for starting the printing operation. The thermal printing operation will be described in detail later. Since a controlling operation for confirming the position for starting the printing operation is not the substance of the present invention, and therefore further description thereof will not be made hereinafter.

The top paper board 22a has a square recess 23 around at its central portion to receive the stamping-face plate 17 tightly therein. The stamping-face plate 17 is pressed into the recess 23 (hereinafter sometimes, referred to as the "positioning recess") to be held in position.

It is preferable that the top paper board 22a has substantially the same thickness as the stamping-face plate 17 and is a little thinner than the stamping-face plate 17 within the range that no trouble is caused in the printing operation. This is because the printing operation is performed with the thermal head 18 pressed against onto the surface of the stamping-face plate 17 for enhancing the efficiency of heat conduction. It is also preferable that a difference in level between the top paper board 22a and the stamping-face plate 17 is not so large, to prevent the thermal head 18 from being caught by such difference during the printing operation.

Just for information, the stamping-face plate 17 is 1.5 mm in thickness and the top paper board 22a is 0.79 mm in thickness in the present embodiment.

The bottom paper board 22b is made plain and also made to have the same external shape as the top paper board 22a. The bottom paper board 22b and the top paper board 22a are integrated together by adhering. When the stamping-face plate 17 is received in the positioning recess 23 of the top paper board 22a, the bottom paper board 22b supports the bottom surface of the stamping-face plate 17. As shown in FIG. 3C, the bottom paper board 22b is perforated (perforation 24) along the positioning recess 23 shown in FIG. 3A. At the top portion of the perforation 24 as seen in FIG. 3C, an arc-like cut in 24a is made and on the both sides of the cut in 24a, perforations 24b, 24b extending to the side edges of the bottom paper board are made. The stamping-face plate 17 held in the stamping-face plate holder 15 is made of an ink-impregnated sponge body. In the present embodiment, for example, the ethylene-vinyl acetate copolymer is used as a material of the sponge body.

As shown in FIG. 3B, the surface of the top paper board 22a, and the top surface and sides of the stamping-face plate 17 exposing from the positioning recess 23 of the top paper board 22a are covered with a film 26.

The film 26 is made of a base material such as PET (polyethylene terephthalate) and/or polyamide. The film 26 has a heat resistance, a heat conductivity and also a smoother surface. A material having a heat resistance to temperature higher than the melting point of the stamping-face plate 17 is used to make the film 26.

Figure 4:
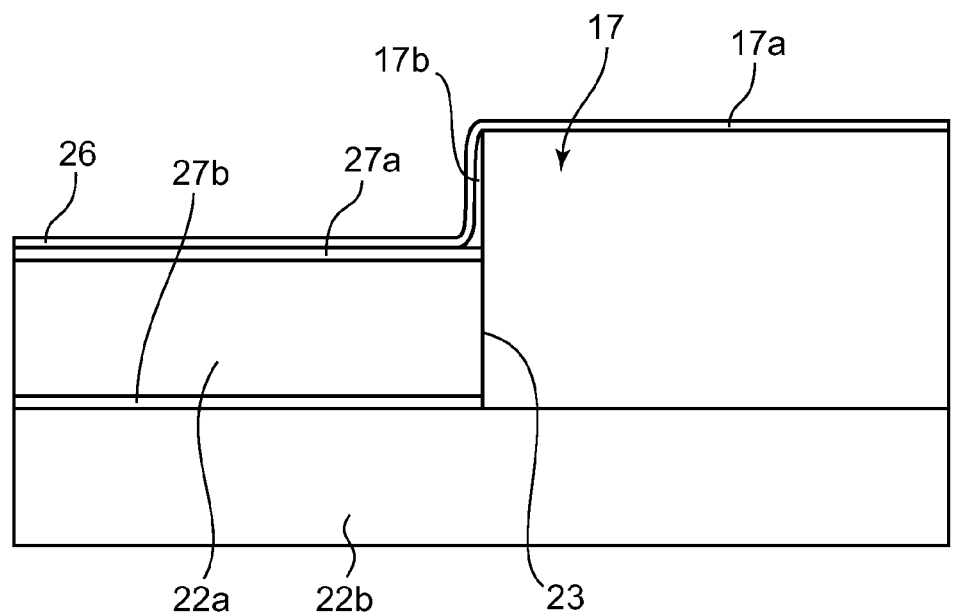
FIG. 4 is an enlarged view showing a portion surrounded by a broken-line circle "a" in FIG. 3A.

FIG. 4 is an enlarged view showing the portion of the stamping-face plate holder 15 surrounded by the broken-line circle "a" in FIG. 3B. As shown in FIG. 4, the top paper board 22a and the bottom paper board 22b are bonded together with a both-side adhesive sheet 27b.

The film 26 covers the surface of the top paper board 22a excluding the portion corresponding to the positioning recess 23 where the stamping-face plate holder 15 is pressed into, and is bonded to said surface with a both-side adhesive sheet 27a.

Further, the film 26 covers the surface 17a and the side 17b of the stamping-face plate 17 exposing from the positioning recess 23 of the top paper board 22a but does not adhere to them. Therefore, when a plate making of the stamping-face plate 17 finishes as will be described later, the stamping-face plate 17 can be easily taken out from the stamping-face plate holder 15 by removing the bottom paper board 22b along the perforation 24 shown in FIG. 3C.

Now, the principle for making a stamping-face plate of a stamp in the present embodiment will be described briefly. As described above, the porous EVA is used to compose the stamping-face plate 17, and the surface of the porous EVA is heated with the thermal head to make the stamping-face plate of a stamp. Since the porous EVA (hereinafter, simply referred to as the "EVA") contains countless numbers of air bubbles, it is possible to impregnate EVA with liquid such as ink, just like sponges.

Further, EVA has a physical property of heat plasticity, and therefore, when EVA is heated, for instance, to 70 to 120 degrees centigrade, the heated portion softens and the portion which has softened once will harden when cooled down. The hardened portion loses air bubbles, turning to a non-porous portion and prevents liquid such as ink from passing through.

In the present embodiment, this physical property (heat plasticity) of EVA is used. When an arbitrary part of the surface of EVA (composing the stamping face of a stamp) is heated about 1 to 5 milliseconds by the thermal head, the arbitrary part of the surface of EVA (composing the stamping face of a stamp) turns to a non-porous part, preventing the ink impregnated therein from passing through.

In other words, in a seal impression of a stamp, "the portions where the ink is allowed to pass through are not heated, and the portions where the ink is not allowed to pass through are heated by the thermal head." In this way, the portions which allow the ink impregnated therein to seep out are formed in the seal impression.

When this heating treatment by the thermal head is performed in place of the printing process executed in conventional thermal printers, white and black in stamping data representing the seal impression will be inverted.

Using this phenomenon, when the white and black are turned over in accordance with the seal impression desired by a user and the surface of EVA is selectively heated, the ink impregnated in the heated portions is not allowed to pass through and the saturated ink is allowed to pass through in accordance with the seal impression formed with the not heated portions.

From the portions not heated during the heating treatment performed on the surface of EVA, the ink impregnated therein can seep out. Therefore, the portions other than the portions of the seal impression that the user desires have to be heated to prevent the ink from seeping out there from.

In general, it is inevitable in a mass production process that the central position of EVA (composing the stamping face of a stamp) is set a little out of the center line of the thermal head drawn on a design drawing, due to an assembly error. In practice, this discrepancy set in the production process between the central position of EVA and the center line of the thermal head can allow the ink to seep out from the portion that the user does not intend.

More specifically, it is presumed that data of the seal impression drawn by the user represents a seal impression of 30 mm×30 mm, and that a seal impression to be subjected to the heating treatment by the thermal head has a size of 30 mm×30 mm.

In the case where the position of EVA is set out of place by 1 mm in a scanning direction, the center of the stamping face is not only set out of place by 1 mm but also the edge of EVA of 1 mm cannot be heated. As a result, the ink can seep out from there.

To avoid the above trouble in the heating treatment by the thermal head, for example, stamping data which contains the seal impression edited by the user and further solid-black area surrounding said seal-impression is prepared in the present embodiment and used as data for making a plate of a seal impression. The solid-black area in the stamping data serves as an area for preventing the ink from seeping out.

When a stamping face of 30 mm×30 mm is provided to the users, the actual size of the stamping face will be (30+α) mm×(30+α) mm, where α=1 mm to 2 mm.

What is to be edited and produced by the user is data of a seal impression to be stamped on an object. Therefore, in practice, the seal impression desired by the user is produced, and the mirror-image of the seal impression is inverted to produce data of the inverted mirror-image of the seal impression. Then, the data of the inverted mirror-image of the seal impression is used to make a plate of EVA (composing the stamping face of a stamp).

In short, the data of the seal impression edited and produced by the user is subjected to the "black-white inverting process" and the "mirror-image inverting process", and then the solid-black data is added to the processed seal-impression data, whereby the final stamping data to be supplied to the thermal printer is completed.

By heating the surface of EVA (composing the stamping face of a stamp) based on the stamping data with the thermal head, it is possible to make a stamping-face plate having the seal impression unique to the user in a simple manner. The user bends the bottom paper board 22b along the perforations 24b, 24b and then the arc-like cut in 24a is left (refer to FIG. 3C). Further, the user grips this arc-like cut in 24a to strip off the portion surrounded by the perforation 24, and can take out the completed stamping-face plate from the stamping-face plate holder 15.

EVA (used for composing the stamping face of a stamp) is a material having 1.5 mm in thickness, and has a high elasticity coefficient and a high friction coefficient. When the stamping-face plate holder 15 with EVA (composing the stamping-face plate 17) held is inserted into the thermal printer 1 to be transported to position, the stamping-face plate holder 15 cannot be transported in a stable straight line because of great friction between the thermal head and EVA.

Even if the thermal printer is provided with guides for transporting the stamping-face plate holder 15 smoothly and stably in a straight line, EVA can easily crook when the stamping-face plate holder 15 slightly turns the advancing direction because EVA is flexible and has an extremely large friction coefficient.

The above difficulty in transporting EVA is a phenomenon that is caused even when the thermal head does not generate heat. When the thermal head generates heat, the temperature of the thermal head rises to about 200 degrees centigrade within several milliseconds after it has started generating heat, and the surface of EVA has softened at the time when heated, and therefore the thermal head will sink in the softened EVA, preventing the stamping-face plate holder 15 with EVA (composing the stamping-face plate 17) held from moving anymore.

As described above, in the system of using the edge head as the thermal head and in the system in which a carriage is installed in the head carrying mechanism, the above trouble will not be caused, but the above systems will invite another inconvenience that the mechanism will be large in size and costs of parts will increase.

The present invention has been made to provide the stamping-face plate holder 15, shown in FIGS. 2A and 2B to FIG. 4, which is used to make a stamping-face plate made of EVA. As described above, EVA is hard in transportation because of its flexibility and high friction coefficient. More specifically, in the present embodiment of the present invention, the thermal printer 1 provided with the normal thermal head, shown in FIG. 1, FIG. 2A and FIG. 2B, will be made small in size and cheap in manufacturing cost and uses the above stamping-face plate holder 15 to make a stamping-face plate made of EVA.

The configuration of the stamping-face plate holder 15 in the first embodiment has been described with reference to FIGS. 3A, 3B, 3C and FIG. 4 in detail. Hereinafter, additional description of the stamping-face plate holder 15 will be given with respect to its functions and configuration.

Four sides of the stamping-face plate 17 held in the positioning recess 23 of the stamping-face plate holder 15 are cut by a heat cutter. Therefore, the ink impregnated in the stamping-face plate 17 does not seep out from the four side surfaces.

The stamping-face plate 17 is held in the positioning recess 23 of the top paper board 22a, supported from beneath by the bottom paper board 22b, and covered over with the film 26. Therefore, when held in the positioning recess 23 of the top paper board 22a, the stamping-face plate 17 is hard to be deformed even if it receives any external force.

Therefore, the stamping-face plate 17 can be transported as the user's intention and, also transported in the straight direction as user's intention. The film 26 has a heat-resisting property higher than the melting point of the stamping-face plate 17, that is, EVA.

Even though the surface of the stamping-face plate 17 should be melted by the thermal head 18, the film 26 will not be melted. The friction between the thermal head 18 and the film 26 is extremely low.

Therefore, even though the surface of the stamping-face plate 17 is melted and softened, the film 26 covering over the plate 17 prevents the thermal head 18 from sinking into the plate 17, and allows the thermal head 18 to continue a heat-printing operation thereon smoothly, finishing making the stamping-face plate 17.

Figure 5:
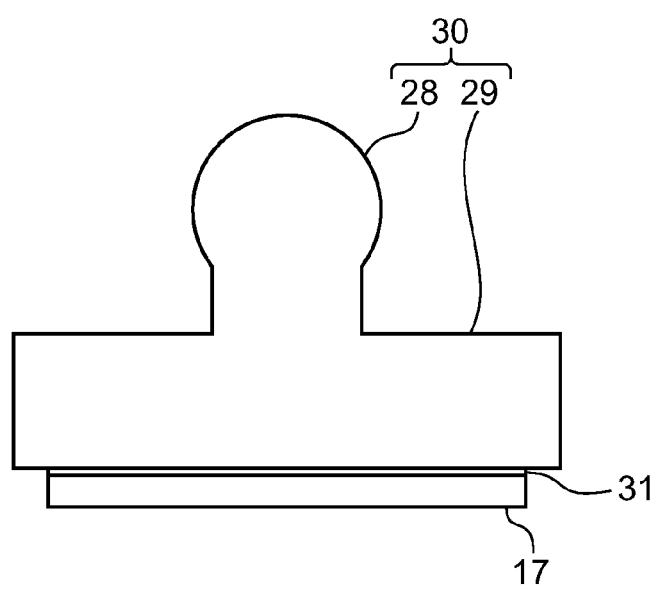
FIG. 5 is a view showing a seal or stamp consisting of a wood block with the stamping-face plate attached, said stamping-face plate taken out from the finished stamping-face plate holder.

FIG. 5 is a view showing a stamp consisting of a wood block with the stamping face attached, said stamping face being taken out from the stamping-face plate holder 15 after the making plate operation. As shown in FIG. 5, the stamping-face plate 17 with the stamping face facing beneath is attached to the bottom of the wood block 30 with a both-side adhesive sheet 31. The wood block consists of a ball-like gripe 26 and a base block 29.

When the stamping-face portion of the stamp is dipped in ink for a given period of time, the ink impregnates into the stamping-face plate 17. After cleaning excessive ink on the stamping face, the user holds the ball-like gripe 26 to press the base block against the object. Then the ink seeps out from the stamping face to leave the seal impression on the object.

[Second Embodiment]

In the first embodiment of the invention, the perforation 24 is made in the bottom paper board 22b along the positioning recess 23. When the stamping-face plate 17 is taken out from the stamping-face plate holder 15, the user bends the bottom paper board 22b along the perforations 24b, 24b and grips the arc-like cut in 24a, striping off the portion surrounded by the perforation 24.

In the second embodiment of the invention, only a straight-line perforation 24b is made in both top paper board 22a and bottom paper board 22b in place of the perforation 24 of a four-sided figure. When taking out the stamping-face plate 17 from the stamping-face plate holder 15, the user bends both the top and bottom paper boards 22a, 22b towards the top paper board side 22a. When bent, both the top and bottom paper boards 22a, 22b are cut and separated along the perforation 24b, but the film 26 still remains attached to the separated paper boards. Therefore, when the paper boards are further separated apart, the film 26 in the vicinity of the stamping-face plate 17 is peeled off from the top paper board 22a, allowing the user to take out the stamping-face plate 17 with the stamping face facing the user.

It is possible in the second embodiment of the invention to make the thick paper board (coated board) 22 from a single paper board instead of using two paper boards 22a, 22b and to provide at the center of the single paper board a concave portion for receiving and positioning the stamping-face plate 17.

FIG. 6A is a plane view of the stamping-face plate holder holding the stamping-face plate 17. FIG. 6B is a cross-sectional view of the stamping-face plate holder 32 taken along the line B-B' of FIG. 6A. FIG. 6C is a rear view of the stamping-face plate holder 32.

As shown in FIG. 6B, the stamping-face plate holder 32 serves as a holder and consists of a single paper board 22 which is provided with the positioning concave portion 33. As shown in FIG. 6A and FIG. 6B, the concave portion 33 holds and positions the stamping-face plate 17.

In the stamping-face plate holder 32, only a single straight-line perforation 24b is made in place of the perforation of a four-sided figure (FIG. 3C) in the paper board 22, as shown in FIG. 6A and FIG. 6C. When the end portion 32a of the stamping-face plate holder 32 is bent in the forward direction as indicated by an arrow "b" in FIG. 6B, the end portion 32a is cut and separated from the body of the stamping-face plate holder 32 along the perforation 24b. When the end portion 32a is further separated away from the body, the film 26 in the vicinity of the stamping-face plate 17 is also peeled off from the paper board 22 together with the film 26 attached to the end portion 32a, allowing the user to take out the stamping-face plate 17 from the concave portion 33 of the stamping-face plate holder 32.

[Third Embodiment]

Figure 7A:
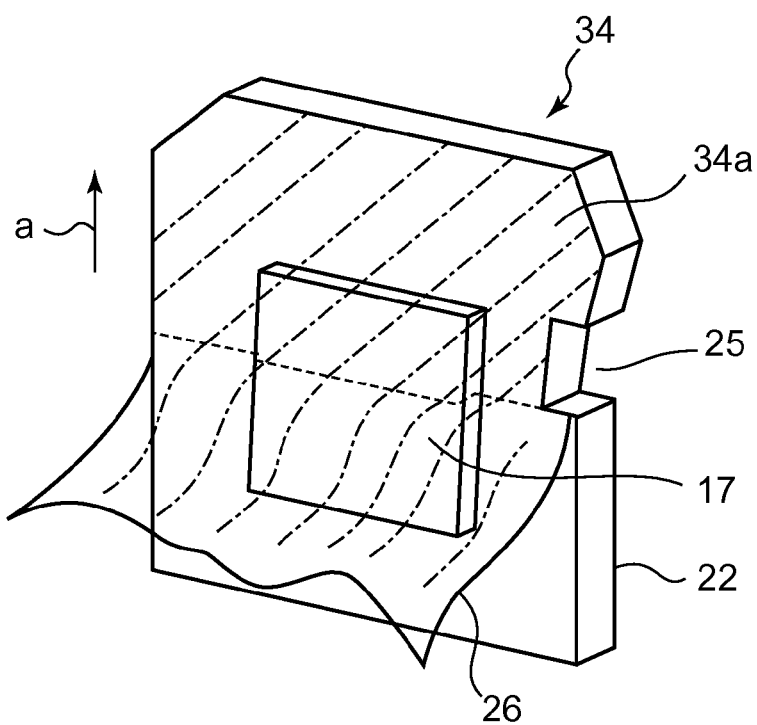
FIGS. 7A, 7B and 7C are views showing a stamping-face plate holder according to the third embodiment of the invention.
Figure 7B:
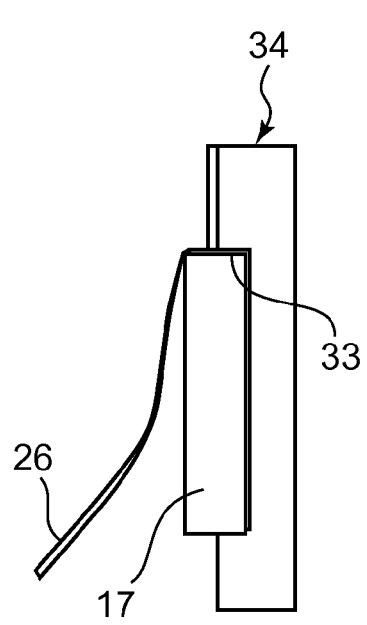
Figure 7C:
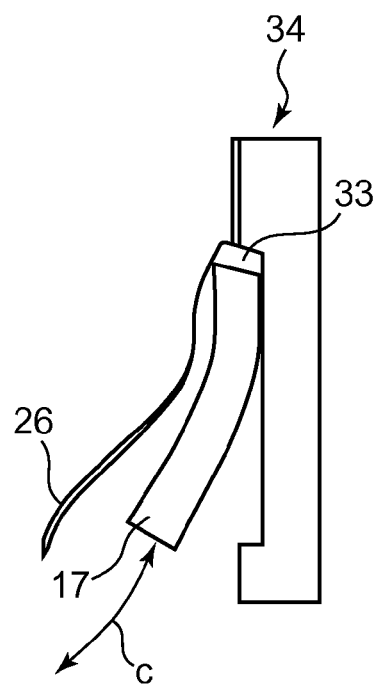

FIGS. 7A, 7B and 7C are views showing a configuration of a stamping-face plate holder in the third embodiment of the invention. In the stamping-face plate holders 15, 32 in the first and second embodiments, the film 26 is bonded to the surface in the vicinity of the positioning recess 23 and/or the concave portion 33 with the both-side adhesive sheet 27b.

But in the stamping-face plate holder 34 in the third embodiment, the film 26 covers over the whole surface of the stamping-face plate holder 34, but the film 26 is bonded only to the surface of the front half portion 34a of the stamping-face plate holder 34 seen in the transport direction as indicated by an arrow "a" in FIG. 7A with the both-side adhesive sheet 27b. The film 26 covers over the surface of the rear half portion of the stamping-face plate holder 34 but does not adhere to the portion.

Therefore, when the plate making of the stamping-face plate 17 has finished, the user simply picks up at the end of the film 26 as shown in FIG. 7B, and can easily take out the stamping-face plate 17 from the stamping-face plate holder 34.

Further, since the stamping-faceplate 17 can be replaced with another new plate, as indicated by an arrow "c" in FIG. 7C, the elements other than the stamping-face plate 17 can be used any number of times, and the stamping-face plate holder 34 can be made economical. The stamping-face plate holder consisting of a single paper board is shown in FIGS. 7A, 7B and 7C, but it is possible to use paper boards 22a, 22b to make the stamping-face plate holder and to provide the positioning recess 23 in place of the positioning concave portion 33. The positioning of the stamping-face plate 17 is not limited to those described herein, and any element which can fix the stamping-face plate 17 in place can be used in place of the positioning recess and the positioning concave portion. For example, a hook-like gripper can be used as the positioning elements. It will be possible to use an adhesive material to detachably fix the two or four corners of the rear surface of the stamping-face plate 17 to the stamping-face plate holder 15.

The size and configuration of the stamping-face plate holder 15 (32 and 34), and also the size and configuration of the stamping-face plate 17 are not restricted to those described in the embodiments of the invention, but may be arranged. In particular, the size of the stamping-face plate holder 15 (32 and 34) and the size of the stamping-face plate 17 in the direction perpendicular to the transporting direction (as indicated by the arrow "a" in FIG. 3A) of the stamping-faceplate holder 15 (32 and 34) is determined based on the configuration of the thermal printer 1, but the size of the stamping-face plate holder 15 (32 and 34) in its transporting direction (as indicated by the arrow "a" in FIG. 3A) is not limited. Accordingly, there is no limitation in the size of the stamping-face plate 17 in the transporting direction (as indicated by the arrow "a" in FIG. 3A) of the stamping-faceplate holder 15 (32 and 34).

The quality of material used for the stamping-face plate holder 15 is not limited to the coated board described in the embodiments, but any material can be used, which can hold the stamping-face plate 17 in place and transports the same steadily during the plate making.

Particularly in the third embodiment of the invention, the stamping-face plate holder 15 is repeatedly used many times, and therefore, the material used to make the stamping-face plate holder 15 is selected placing priority on durability rather than on cheapness, different in other embodiments.

The base material of the film 26 is not limited to PET (polyethylene terephthalate) and/or polyamide used in the embodiments, but any material which has a heat resistance to temperature higher than the melting point of the stamping-face plate 17 and has a heat conductivity required for the plate making and surface smoothness required for transporting the stamping-face plate holder 15 can be used as the base material of the film 26.

Having described and illustrated the principles of the invention with reference to preferred embodiments of the invention, it should be apparent that the embodiments may be modified in arrangement and detail without departing from the principles disclosed herein and it is intended that the invention be concluded as including all such modifications and variations insofar as they come within the spirit and scope of such subject matter disclosed herein.

What is claimed is:

1. A stamping-face plate holder comprising:
   a plate holding member which detachably holds a stamping-face plate, the stamping-face plate including a porous material impregnated with ink; and
   a film which covers at least a portion of the stamping-face plate held in the plate holding member,
   wherein:
   the plate holding member is formed with a positioning recess for positioning the stamping-face plate, and
   the plate holding member is formed with a perforation, the perforation extending along at least one side of the positioning recess toward at least one side of the plate holding member.

2. The stamping-face plate holder according to claim 1, wherein the plate holding member is made of a coated board.

3. The stamping-face plate holder according to claim 2, wherein:
   the plate holding member comprises at least a top paper board and a bottom paper board, both boards having a same external shape and being integrated by adhering; and
   the positioning recess is formed in the top paper board.

4. The stamping-face plate holder according to claim 3, wherein the film adheres to a surface of the plate holding member surrounding the stamping-face plate held in the plate holding member and a portion of the film covering the stamping-face plate held in the plate holding member does not adhere to the stamping-face plate.

5. The stamping-face plate holder according to claim 4, wherein the porous material of the stamping-face plate is ethylene-vinyl acetate copolymer.

6. The stamping-face plate holder according to claim 3, wherein:
a surface of the plate holding member surrounding the stamping-face plate held therein is divided into a first area and a second area; and
the film covers and adheres to the first area and covers and does not adhere to the second area and the stamping-face plate held in the plate holding member.

7. The stamping-face plate holder according to claim 1, wherein the film adheres to a surface of the plate holding member surrounding the stamping-face plate held in the plate holding member and a portion of the film covering the stamping-face plate held in the plate holding member does not adhere to the stamping-face plate.

8. The stamping-face plate holder according to claim 1, wherein
a surface of the plate holding member surrounding the stamping-face plate held therein is divided into a first area and a second area; and
the film covers and adheres to the first area and covers and does not adhere to the second area and the stamping-face plate held in the plate holding member.

9. The stamping-face plate holder according to claim 1, wherein the porous material of the stamping-face plate is ethylene-vinyl acetate copolymer.

10. The stamping-face plate holder according to claim 1, wherein the perforation surrounds the positioning recess.

11. The stamping-face plate holder according to claim 1, wherein the stamping-face plate is received in the positioning recess.

12. The stamping-face plate holder according to claim 1, wherein the perforation extends toward respective sides of the plate holding member.

13. The stamping-face plate holder according to claim 1, wherein the perforation extends toward both sides of the plate holding member.

* * * * *